United States Patent
Liu et al.

(10) Patent No.: US 7,741,765 B2
(45) Date of Patent: Jun. 22, 2010

(54) FIELD EMISSION ELEMENT AND MANUFACTURING METHOD THEREOF

(75) Inventors: Liang Liu, Beijing (CN); Kai-Li Jiang, Beijing (CN); Shou-Shan Fan, Beijing (CN); Caesar Chen, Fremont, CA (US); His-Fu Lee, Tu-Cheng (TW); Ga-Lane Chen, Fremont, CA (US)

(73) Assignees: Tsinghua University, Beijing (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 462 days.

(21) Appl. No.: 11/644,257

(22) Filed: Dec. 21, 2006

(65) Prior Publication Data

US 2007/0284987 A1 Dec. 13, 2007

(30) Foreign Application Priority Data

Jun. 9, 2006 (CN) .......................... 2006 1 0061093

(51) Int. Cl.
*H01J 1/304* (2006.01)
*H01J 9/02* (2006.01)

(52) U.S. Cl. .................... 313/311; 313/495; 313/496; 313/497; 445/23; 445/24; 445/25

(58) Field of Classification Search ................ 313/311, 313/495–497; 445/23–25
See application file for complete search history.

(56) References Cited

U.S. PATENT DOCUMENTS

| 6,646,623 | B1 | 11/2003 | Chakrabarti | |
|---|---|---|---|---|
| 6,682,677 | B2 * | 1/2004 | Lobovsky et al. | ...... 264/172.11 |
| 6,692,327 | B1 | 2/2004 | Deguchi et al. | |
| 6,759,305 | B2 | 7/2004 | Lee et al. | |
| 2002/0074932 | A1 | 6/2002 | Bouchard et al. | |
| 2002/0113335 | A1 * | 8/2002 | Lobovsky et al. | ........... 264/184 |
| 2003/0083421 | A1 * | 5/2003 | Kumar et al. | ............... 524/496 |
| 2004/0051432 | A1 * | 3/2004 | Jiang et al. | .................. 313/311 |

(Continued)

FOREIGN PATENT DOCUMENTS

CN 1410475 4/2003

(Continued)

OTHER PUBLICATIONS

Taylor, G.F., "A Method of Drawing Metallic Filaments And A Discussion Of Their Properties And Uses", 1924 Physical Review vol. 23, 655-660.*

(Continued)

*Primary Examiner*—Bumsuk Won
*Assistant Examiner*—Nathaniel J Lee
(74) *Attorney, Agent, or Firm*—Jeffrey T. Knapp

(57) ABSTRACT

A field emission element includes at least one supporting wire and at least one carbon nanotube wire. The supporting wire and the carbon nanotube wire are twisted together. A method for manufacturing the described field emission element is also provided. The method includes the steps of: (a) providing at least one carbon nanotube wire and at least one supporting wire; (b) twisting the carbon nanotube wire and the supporting wire together to form a multi-strand structure by a spinning process; and (c) cutting the multi-strand structure according to a predetermined length to form a field emission element.

15 Claims, 2 Drawing Sheets

U.S. PATENT DOCUMENTS

| | | |
|---|---|---|
| 2004/0095050 A1 | 5/2004 | Liu et al. |
| 2004/0118583 A1* | 6/2004 | Tonucci et al. ............... 174/36 |
| 2004/0150312 A1 | 8/2004 | McElrath et al. |
| 2004/0189177 A1* | 9/2004 | Liu et al. .................... 313/311 |
| 2004/0192153 A1 | 9/2004 | Liu et al. |
| 2004/0209385 A1 | 10/2004 | Liu et al. |
| 2005/0035701 A1 | 2/2005 | Choi et al. |
| 2005/0112051 A1* | 5/2005 | Liu et al. ................. 423/447.1 |
| 2005/0170177 A1* | 8/2005 | Crawford et al. ............ 428/375 |
| 2005/0228140 A1* | 10/2005 | Rajagopalan et al. ....... 525/221 |
| 2005/0239364 A1 | 10/2005 | Yang |
| 2006/0022568 A1* | 2/2006 | Kornilovich et al. ........ 313/271 |
| 2006/0073332 A1 | 4/2006 | Huang et al. |
| 2006/0091782 A1 | 5/2006 | Liu et al. |
| 2006/0135677 A1 | 6/2006 | Huang et al. |
| 2007/0144780 A1* | 6/2007 | Jiang et al. ................ 174/94 R |
| 2008/0170982 A1* | 7/2008 | Zhang et al. ............. 423/447.3 |

FOREIGN PATENT DOCUMENTS

| | | |
|---|---|---|
| CN | 1493711 A | 5/2004 |
| CN | 1674192 | 9/2005 |
| TW | I231518 | 4/2005 |
| TW | 200519036 | 6/2005 |
| TW | I245079 | 12/2005 |
| TW | I246103 | 12/2005 |
| WO | WO2005/045671 | 5/2005 |
| WO | WO 2007015710 A2 * | 2/2007 |

OTHER PUBLICATIONS

Zhang, Mei, Atkinson, Ken R., Baughman, Ray H., "Multifunctional Carbon Nanotube Yarns by Downsizing an Ancient Technology", Nov. 19, 2004 Science vol. 306 1358-1361.*

Vigolo, Brigitte, Penicaid, Alain, Coulon, Claude, Sauder, Cedric, Pailler, Rene, Journet, Catherine, Bernier, Patrick, Poulin, Philippe, "Macroscopic Fibers and Ribbons of Oriented Carbon Nanotubes", Nov. 17, 2000 Science vol. 290 1331-1334.*

Kumar, Satish, Dang, Thuy D., Arnold, Fred E., Bhattacharyya, Arup R., Min, Byung G., ZHang, Xiefei, Vaia, Richard A., Park, Cheol, Adams, W. Wade, Hauge, Robert H., Smalley, Richard E., Ramesh, Sivarajan, Willis, Peter A., "Synthesis, Structure, and Properties of PBO/SWNT Composites" 2002 Macromolecules Volumn 35 9039-9043.*

Vigolo, Brigitte, Penicaid, Alain, Coulon, Claude, Sauder, Cedric, pailler, Rene, Journet, Catherine, Bernier, Patrick, Poulin, Philippe, "Macroscopic Fibers and Ribbons of Oriented Carbon Nanotubes", Nov. 17, 2000 Science vol. 290 1331-1334.*

Kumar, Satish, Dang, Thuy D., Arnold, Fred E., Bhattacharyya, Arup R., Min, Byung G., Zhang, Xiefei, Vaia, Richard A., Park, Cheol, Adams, W. Wade, Hauge, Robert H., Smalley, Richard E., Ramesh, Sivarajan, Willis, Peter A., "Synthesis, Structure, and Properties of PBO/SWNT Composites" 2002 Macromolecules vol. 35 9039-9043.*

G. F. Taylor, A Method of Drawings Metallic Filaments and a Discussion of Their Properties and Uses, Physical Review 23, 655-660, US.

* cited by examiner

FIELD EMISSION ELEMENT AND MANUFACTURING METHOD THEREOF

BACKGROUND

1. Field of the Invention

The invention relates generally to field emission elements and manufacturing methods thereof and, more particularly, to field emission elements employing a carbon nanotube wire and a manufacturing method thereof.

2. Discussion of Related Art

Carbon nanotubes (CNTs) produced by means of arc discharge between graphite rods were first discovered and reported in an article by Sumio Iijima, entitled "Helical Microtubules of Graphitic Carbon" (Nature, Vol. 354, Nov. 7, 1991, pp. 56-58). Carbon nanotubes are electrically conductive along their length, chemically stable, and each can have a very small diameter (much less than 100 nanometers) and large aspect ratios (length/diameter). Due to these and other properties, it has been suggested that carbon nanotubes can play an important role in fields such as microscopic electronics, field emission devices, thermal interface materials, etc.

Generally, a CNT field emission element includes a conductive cathode electrode and a carbon nanotube formed on the cathode electrode. The carbon nanotube acts as an emitter of the field emission element. The methods adopted for forming the carbon nanotube on the conductive cathode electrode mainly include mechanical methods and in-situ synthesis methods. One mechanical method is performed by using an Atomic force microscope (AFM) to place a synthesized carbon nanotube on a conductive cathode electrode, then fixing the carbon nanotube on the conductive cathode electrode, via a conductive paste or adhesive. The mechanical method is relatively easy/straightforward. However, the precision and efficiency thereof are relatively low. Furthermore, the electrical connection between the conductive base and the carbon nanotube tends to be poor because of the limitations of the conductive adhesives/pastes used therebetween. Thus, the field emission characteristics of the carbon nanotube are generally unsatisfactory.

One in-situ synthesis method is performed by coating metal catalysts on a conductive cathode electrode and directly synthesizing a carbon nanotube on the conductive cathode electrode by means of chemical vapor deposition (CVD). The in-situ synthesis method is relatively easy. Furthermore, the electrical connection between the conductive base and the carbon nanotube is typically good because of the direct engagement therebetween. However, the mechanical connection between the carbon nanotube and the conductive base often is relatively weak and thus unreliable. Thus, in use, such a carbon nanotube is apt, after a period of time, to break away (partially or even completely) from the conductive cathode electrode due to the mechanical stress associated with the electric field force. Such breakage would damage the field emission electron source and/or decrease its performance. Furthermore, in the in-situ synthesis method, controlling of the growth direction of the carbon nanotube is difficult to achieve during the synthesis process. Thus, the production efficiency thereof can be relatively low, and the controllability thereof is often less than desired. Still furthermore, the in-situ synthesis method has a relatively high cost.

What is needed, therefore, is a field emission element that promotes a good mechanical and electrical connection between the carbon nanotube and the conductive cathode electrode and that, thus, tends to have satisfactory field emission characteristics.

What is also needed is a method for manufacturing the above-described field emission electron source, the method having a relatively low cost, relatively high production efficiency, and an improved controllability.

SUMMARY

In one embodiment, a field emission element includes at least one supporting wire and at least one carbon nanotube wire. The carbon nanotube wire and the supporting wire are twisted together.

In another embodiment, a method for manufacturing the above-described field emission element includes the following steps: (a) providing at least one carbon nanotube wire and at least one supporting wire; (b) twisting the carbon nanotube wire and the supporting wire together to form a multi-strand structure; and (c) cutting the multi-strand structure according to a predetermined length to form a field emission element.

Other advantages and novel features of the present field emission element and the related manufacturing method will become more apparent from the following detailed description of preferred embodiments when taken in conjunction with the accompanying drawings.

BRIEF DESCRIPTION OF THE DRAWINGS

Many aspects of the present field emission element and the related manufacturing method can be better understood with reference to the following drawings. The components in the drawings are not necessarily to scale, the emphasis instead being placed upon clearly illustrating the principles of the present field emission element and the related manufacturing method.

Figure 1:
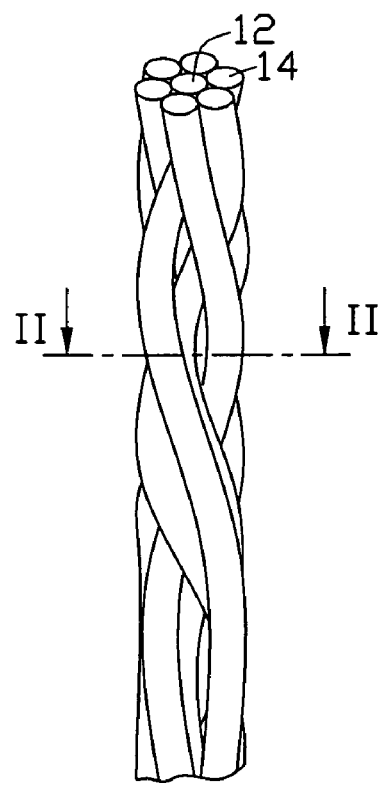
FIG. 1 is an isometric view of a field emission element, in accordance with an exemplary embodiment of the present device, the field emission electron source incorporating a carbon nanotube wire.

Corresponding reference characters indicate corresponding parts throughout the several views. The exemplifications set out herein illustrate at least one preferred embodiment of the present field emission element and the related manufacturing method, in one form, and such exemplifications are not to be construed as limiting the scope of the invention in any manner.

DETAILED DESCRIPTION OF PREFERRED EMBODIMENTS

Reference will now be made to the drawings to describe embodiments of the present field emission element and the related manufacturing method, in detail.

Figure 2:
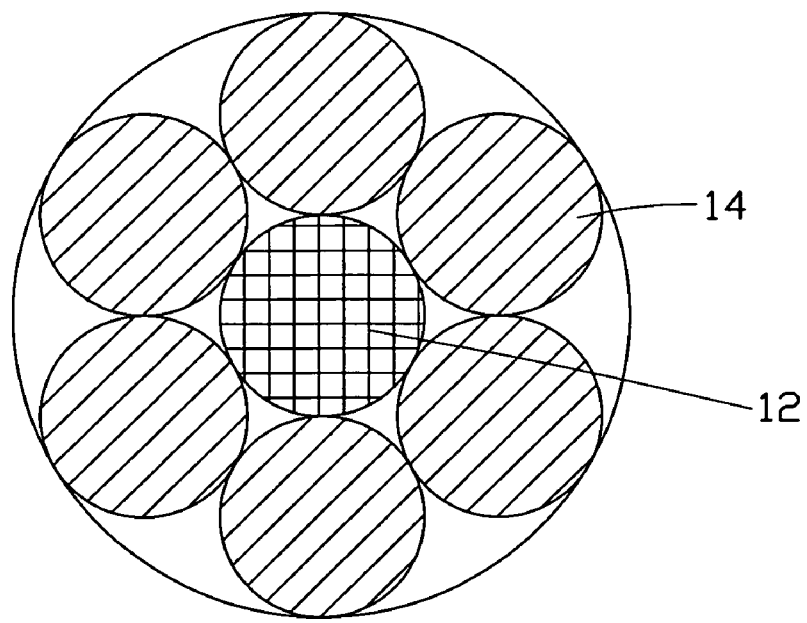
FIG. 2 is a longitudinal sectional view of the field emission element of FIG. 1 along lines II-II.

FIG. 1 is an isometric view of a field emission element 10, in accordance with a first exemplary embodiment of the present device, and FIG. 2 is a longitudinal sectional view of the upper portion of the field emission element 10 of FIG. 1. As shown in FIGS. 1 and 2, the field emission element 10 includes a carbon nanotube wire 12 and a plurality of supporting wires 14 twisted therewith. The carbon nanotube wire 12 is disposed in the center of the field emission element 10, and the supporting wires 14 are twisted on an outer side of the carbon nanotube wire 12. It is noted that the field emission element 10 may further include a plurality of carbon nanotube wires 12 (e.g., in the form of a wire bundle) disposed in the center thereof. The carbon nanotube wire 12 is used for emitting electron and the supporting wires 14 are used for supporting and protecting the carbon nanotube wire 12.

The supporting wires 14 are made of a material selected from a group consisting of copper, silver, gold, nickel, and an emissive metal. It may prove especially advantageous for the supporting wires 14 to made of an emissive metal, such as molybdenum or niobium, as that material could contribute to both the mechanical and field emission properties of the composite field emitter 10. Each supporting wire 14 is, usefully, thread-shaped. A diameter of each supporting wire 14 is, advantageously, in the range from tens of microns to a few millimeters. It is, however, to be understood that even smaller diameter (e.g., nano-scale) supporting wires 14 could potentially be employed, which could allow for a greater emitter density to be created on a given field emitter device (not shown), while still providing an improved level of emitter support.

The carbon nanotube wire 12 may, for example, be a carbon nanotube yarn manufactured by drawing a bundle of the carbon nanotubes out from a super-aligned carbon nanotube array. The bundles of the carbon nanotubes are, typically, connected together by Van Der Waals force interactions to form a continuous carbon nanotube yarn. Furthermore, the carbon nanotube wire 12 may, instead, be a plurality of bundled carbon nanotube yarns. Preferably, a diameter of the carbon nanotube wire 12 is in the range from about 2 microns to about 200 microns. It is, however, to be understood that nano-scale diameters could be employed for the carbon nanotube wires 12, in order to permit greater packing density of field emitters 10 on a given device.

Alternatively, the carbon nanotube wire 12 may be a thread-shaped carbon nanotube-polymer composite. The thread-shaped carbon nanotube-polymer composite includes polymer matrix and a plurality of carbon nanotubes uniformly dispersed therein. Usefully, the polymer is a material selected from a group consisting of Polyethylene Terephthalate (PET), Polycarbonate (PC), Acrylonitrile-Butadiene Styrene Terpolyer (ABS), and PC/ABS. The percent by mass of the carbon nanotubes is in the range of about 1%~10%. In the preferred embodiment, the percent by mass of the carbon nanotubes is about 2%.

In use, a single field emission element 10 is fixed on a conductive cathode electrode (not shown), via the supporting wire 14 thereof, to form a single field emission electron source. Furthermore, a plurality of field emission elements 10 may be fixed on a conductive cathode electrode to form an array of field emission electron sources. Preferably, the carbon nanotube wire 12 of the field emission element 10 has an electrical connection with the cathode electrode. With such a connection, voltage may be applied directly from the cathode electrode to the carbon nanotube wire 12. The field emission element 10 can emit electrons by the carbon nanotube wire 12. It is to be understood that the supporting wire 14 could enhance or, possibly, entirely provide the electrical connection of the CNT wire 12 with the cathode electrode. Further, if an emissive metal is used for the supporting wire 14, the supporting wire 14 could also emit electrons.

Due to the carbon nanotube having good field emission character and the carbon nanotube wire 12 being fixed on the cathode electrode by the supporting wire 14, the mechanical connection between the carbon nanotube wire 12 and the cathode electrode is firm, and the electrical connection therebetween is sufficient. Thus, the electron emitting performance of the field emission element 10 is improved.

Figure 3:
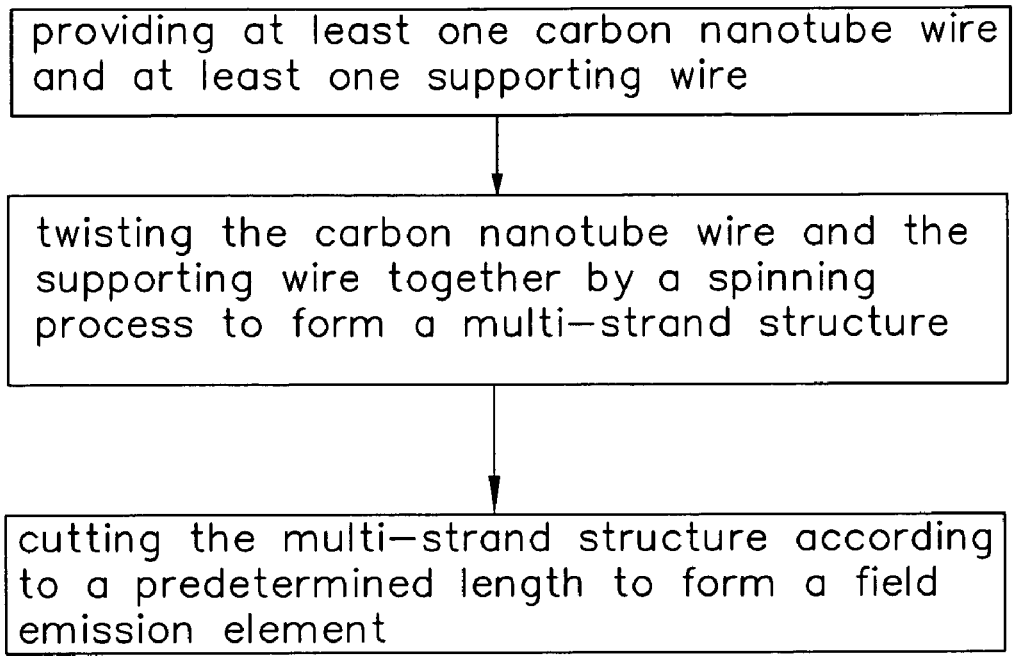
FIG. 3 is a flow chart showing a method for manufacturing the field emission element of FIG. 1.

Referring to FIG. 3, a method for manufacturing the field emission element 10 includes the following steps:
step (a): providing a carbon nanotube wire 12 and a plurality of supporting wire 14;
step (b): twisting the carbon nanotube wire 12 and the supporting wires 14 together to form a multi-strand structure; and
step (c): cutting the multi-strand structure according to a predetermined length to form the field emission element 10.

In step (a), the carbon nanotube wire 12 may be a carbon nanotube yarn or a thread-shaped carbon nanotube-polymer composite.

The carbon nanotube yarn may be obtained by drawing a bundle of the carbon nanotubes from a super-aligned carbon nanotube array. Firstly, a bundle of the carbon nanotubes including at least one carbon nanotube is selected from the super-aligned carbon nanotube array. Secondly, the bundle of the carbon nanotubes is drawn out from the super-aligned carbon nanotube array using forceps or another gripping/pulling means, to form a carbon nanotube yarn along the drawn direction. The bundles of the carbon nanotubes are connected together by Van Der Waals force interactions to form a continuous carbon nanotube yarn.

It is to be noted that not all carbon nanotube arrays can be used to create the carbon nanotube yarns. The carbon nanotube yarns can only be drawn out from the super-aligned carbon nanotube arrays. Based on extensive experimentation on the growth mechanisms of carbon nanotubes, the crucial factors for growing a super-aligned carbon nanotube array suitable for production of the yarns are listed below:
i) the substrate should be substantially flat and smooth;
ii) the growth rate should be relatively high; and
iii) the partial pressure of the carbon containing gas should be relatively low.

In general, the combined width of the carbon nanotube yarn can be controlled by a size of the tip of the tool that is used to pull out the yarn. The smaller the tip, the thinner the composite/yarn width. A composite length of the carbon nanotube yarn depends on an area of the super-aligned carbon nanotube array. Experimental data indicates that it may be possible to draw out a 10 m long carbon nanotube yarn from a 100 μm high carbon nanotube array having an area of 1 cm$^2$. Preferably, the diameter of the carbon nanotube yarn is in the approximate range from about 2 to 200 μm.

The method for making the thread-shaped carbon nanotube-polymer composite includes the following steps. Firstly, a solution of a polymer precursor and a plurality of carbon nanotubes are provided. Secondly, the carbon nanotubes are immersed in the solution, and the solution is ultrasonically agitated thereafter to promote mixing of the carbon nanotubes therein. Thirdly, the polymer precursor is polymerized in order to obtain a polymer matrix having carbon nanotubes uniformly dispersed therein. Fourthly, the polymer matrix is treated by way of extrusion to form a thread-shaped carbon nanotube-polymer composite having carbon nanotubes distributed therein.

The plurality of carbon nanotubes can be obtained by a conventional method such as chemical vapor deposition, arc discharging, or laser ablation. Preferably, the carbon nanotubes are obtained by chemical vapor deposition. The diameter of each carbon nanotubes is about in the range from 5 to 40 nm.

Beneficially, the polymer is a material selected from a group consisting of Polyethylene Terephthalate (PET), Polycarbonate (PC), Acrylonitrile-Butadiene Styrene Terpolyer (ABS), and PC/ABS. The diameter of the carbon nanotube-polymer composite is advantageously in the range from about 2 to 200 μm, although a smaller diameter could potentially be employed, based on the application. The percent by mass of the carbon nanotubes is in the range of about 1%~10%. In the preferred embodiment, the percent by mass of the carbon nanotubes is about 2%.

Advantageously, the supporting wires 14 are made of a material selected from a group consisting of copper, silver, gold, nickel, and an emitter metal (e.g., molybdenum). Each supporting wire 14 is thread-shaped. A diameter of each supporting wire 14 is in the approximate range from tens of micron to a few millimeters, but other diameters could be employed, based upon the application.

In step (b), the carbon nanotube wire 12 and the supporting wires 14 are twisted together by a conventional spinning process to form a multi-strand structure used for emitting electrons. The carbon nanotube wire 12 is disposed in the center of the multi-strand structure, and the supporting wires 14 are twisted on the outer side of the carbon nanotube wire 12.

In step (c), the multi-strand structure is cut by a mechanical cutting process or a laser cutting process. Alternatively, the multi-strand structure may be manufactured according to a predetermined length to form the field emission element 10.

Figure 4:
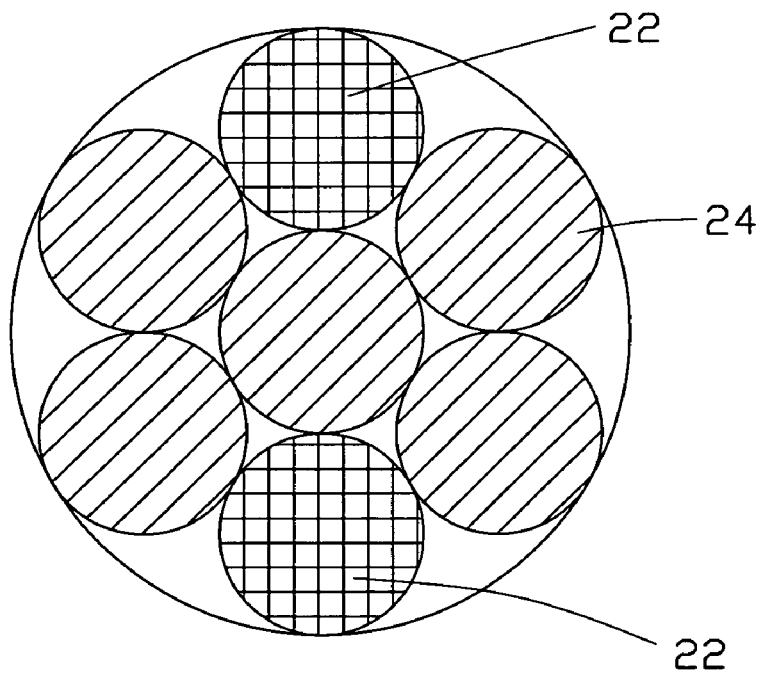
FIG. 4 is a top view of a field emission element, in accordance with another embodiment of the present device, the field emission electron source incorporating two carbon nanotube wires.

Referring to FIG. 4, a longitudinal sectional view of a field emission element 20, in accordance with a second exemplary embodiment of the present device, is shown. The field emission element 20 includes a plurality of carbon nanotube wires 22 and a plurality of supporting wires 24 twisted therewith. The field emission element 20 is similar to the field emission element 10, except that the field emission element 20 includes at least one carbon nanotube wires 22 disposed outside of the supporting wires 24.

It is to be understood that the numbers of the carbon nanotube wires 22 and the supporting wires 24 of the field emission element 20 may be changed. As mentioned above, the carbon nanotube wires 22 are used for emitting electrons, and the supporting wires 24 are primarily used for supporting and protecting the carbon nanotube wires 22.

Compared with conventional field emission elements and the methods, the field emission element of the preferred embodiment can exhibit the excellent field emission properties of the carbon nanotubes. Further, the field emission element formed of the carbon nanotube wires and the supporting wires generally has a size that is more amenable to handling than many CNT-based emitters. Furthermore, the carbon nanotube wires are supported and protected by the supporting wires. Thus, the field emission element has excellent mechanical properties, as well. Additionally, the method of the preferred embodiment adopts a conventional spinning process to twist the carbon nanotube wires and the supporting wires together. Therefore, the method of producing such emitters is simple and is well suited for large-scaled manufacture.

Finally, it is to be understood that the above-described embodiments are intended to illustrate rather than limit the invention. Variations may be made to the embodiments without departing from the spirit of the invention as claimed. The above-described embodiments illustrate the scope of the invention but do not restrict the scope of the invention.

We claim:

1. A field emission element comprising:
    at least one supporting wire; and
    at least one carbon nanotube wire, the at least one carbon nanotube wire and the at least one supporting wire are twisted together,
    a conductive cathode electrode, wherein the supporting wire is electrically fixed on the conductive cathode electrode and comprised of a material different from that of the at least one carbon nanotube wire.

2. The field emission element as claimed in claim 1, wherein the carbon nanotube wire is comprised of at least one carbon nanotube yarn and a thread-shaped carbon nanotube-polymer composite.

3. The field emission element as claimed in claim 2, wherein a diameter of the carbon nanotube wire is in the approximate range from about 2 to about 200 μm.

4. The field emission element as claimed in claim 2, wherein the thread-shaped carbon nanotube-polymer composite comprises a polymer and a plurality of carbon nanotubes uniformly dispersed therein.

5. The field emission element as claimed in claim 4, wherein a diameter of the carbon nanotube is approximately in the range from about 5 to about 40 nanometers.

6. The field emission element as claimed in claim 4, wherein a percent by mass of the carbon nanotubes is in the range of about 1%~10%.

7. The field emission element as claimed in claim 4, wherein the polymer is comprised of a material selected from a group consisting of Polyethylene Terephthalate, Polycarbonate, Acrylonitrile-Butadiene Styrene Terpolyer and Polycarbonate/Acrylonitrile-Butadiene Styrene Terpolyer.

8. The field emission element as claimed in claim 1, wherein the supporting wire is comprised of a material selected from a group consisting of copper, silver, gold, nickel, and an emissive metal.

9. The field emission element as claimed in claim 8, wherein the emissive metal comprises of molybdenum or niobium.

10. The field emission element as claimed in claim 1, wherein the at least one supporting wire is twisted on an outer surface of at least one carbon nanotube wire.

11. The field emission element as claimed in claim 1, wherein at least one carbon nanotube wire is disposed outside of the supporting wire.

12. The field emission element as claimed in claim 1, wherein at least one carbon nanotube wire has a nano-scale diameter.

13. The field emission element as claimed in claim 1, wherein the at least one carbon nanotube wire is electrically connected to the conductive cathode electrode.

14. A field emission element comprising:
    at least one supporting wire; and
    at least one carbon nanotube wire, the at least one carbon nanotube wire and the at least one supporting wire are twisted together,
    a conductive cathode electrode, wherein the at least one carbon nanotube wire is fixed to the conductive cathode electrode by the at least one supporting wire, and the at least one supporting wire is comprised of an electrically conductive material different from that of the at least one carbon nanotube wire.

15. The field emission element as claimed in claim 14, wherein the supporting wire is comprised of a material selected from the group consisting of molybdenum and niobium.

* * * * *